US007349895B2

(12) United States Patent
Liu et al.

(10) Patent No.: US 7,349,895 B2
(45) Date of Patent: *Mar. 25, 2008

(54) SEMI-AUTOMATIC ANNOTATION OF MULTIMEDIA OBJECTS

(75) Inventors: Wen-Yin Liu, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 412 days.

This patent is subject to a terminal disclaimer.

(21) Appl. No.: 10/969,326

(22) Filed: Oct. 20, 2004

(65) Prior Publication Data
US 2005/0114325 A1 May 26, 2005

Related U.S. Application Data

(63) Continuation of application No. 09/702,288, filed on Oct. 30, 2000, now Pat. No. 6,970,860.

(51) Int. Cl.
*G06F 17/30* (2006.01)

(52) U.S. Cl. ................... 707/3; 707/4; 707/10
(58) Field of Classification Search ............ 707/3, 707/4, 10
See application file for complete search history.

(56) References Cited

U.S. PATENT DOCUMENTS

| | | | |
|---|---|---|---|
| 5,020,019 A | 5/1991 | Ogawa | |
| 5,572,728 A | 11/1996 | Tada et al. | |
| 5,579,471 A | 11/1996 | Barber et al. | |
| 5,594,809 A | 1/1997 | Kopec et al. | |
| 5,721,938 A | 2/1998 | Stuckey | |
| 5,855,015 A | 12/1998 | Shoham | |
| 5,870,754 A | 2/1999 | Dimitrova et al. | |

(Continued)

FOREIGN PATENT DOCUMENTS

| | | |
|---|---|---|
| JP | 11039325 | 2/1999 |
| JP | 2000112959 | 4/2000 |
| WO | WO0045342 | 8/2000 |

OTHER PUBLICATIONS

Lu et al. A Unified framwork for semantic and feature based relevance feedback image retrieval system, International Multimedia conference, Proceedings of eighth ACM international conference on Multimedia, pp. 31-37, 2000.*

(Continued)

*Primary Examiner*—John Breene
*Assistant Examiner*—Baoquoc N. To
(74) *Attorney, Agent, or Firm*—Lee & Hayes, PLLC

(57) ABSTRACT

A multimedia object retrieval and annotation system integrates an annotation process with object retrieval and relevance feedback processes. The annotation process annotates multimedia objects, such as digital images, with semantically relevant keywords. The annotation process is performed in background, hidden from the user, as the user conducts normal searches. The annotation process is "semi-automatic" in that it utilizes both keyword-based information retrieval and content-based image retrieval techniques to automatically search for multimedia objects, and then encourages users to provide feedback on the retrieved objects. The user identifies objects as either relevant or irrelevant to the query keywords and based on this feedback, the system automatically annotates the objects with semantically relevant keywords and/or updates associations between the keywords and objects. As the retrieval-feedback-annotation cycle is repeated, the annotation coverage and accuracy of future searches continues to improve.

23 Claims, 6 Drawing Sheets

U.S. PATENT DOCUMENTS

| | | | |
|---|---|---|---|
| 5,899,999 | A | 5/1999 | De Bonet |
| 5,983,237 | A | 11/1999 | Jain et al. |
| 5,995,978 | A | 11/1999 | Cullen et al. |
| 6,041,335 | A | 3/2000 | Merritt et al. |
| 6,076,088 | A | 6/2000 | Paik et al. |
| 6,092,080 | A | 7/2000 | Gustman |
| 6,105,055 | A | 8/2000 | Pizano et al. |
| 6,285,995 | B1 | 9/2001 | Abdel-Mottaleb et al. |
| 6,301,586 | B1 | 10/2001 | Yang et al. |
| 6,314,420 | B1 | 11/2001 | Lang et al. |
| 6,324,545 | B1 | 11/2001 | Morag |
| 6,369,811 | B1 | 4/2002 | Graham et al. |
| 6,408,293 | B1 | 6/2002 | Aggarwal et al. |
| 6,442,538 | B1 | 8/2002 | Nojima |
| 6,504,571 | B1 | 1/2003 | Narayanaswami et al. |
| 6,557,042 | B1 | 4/2003 | He et al. |
| 6,574,632 | B2 | 6/2003 | Fox et al. |
| 6,643,643 | B1* | 11/2003 | Lee et al. ............... 707/5 |
| 6,728,406 | B1 | 4/2004 | Murao |
| 6,728,706 | B2 | 4/2004 | Aggarwal et al. |
| 6,751,613 | B1* | 6/2004 | Lee et al. ............... 707/5 |
| 6,901,411 | B2 | 5/2005 | Li et al. |
| 6,915,292 | B2 | 7/2005 | Lee et al. |
| 7,043,474 | B2 | 5/2006 | Mojsilovic et al. |
| 7,111,002 | B2 | 9/2006 | Zhang et al. |
| 2002/0069218 | A1* | 6/2002 | Sull et al. ............ 707/501.1 |
| 2007/0033170 | A1* | 2/2007 | Sull et al. ............... 707/3 |
| 2007/0033292 | A1* | 2/2007 | Sull et al. ............... 709/238 |
| 2007/0033515 | A1* | 2/2007 | Sull et al. ............ 715/500.1 |
| 2007/0033521 | A1* | 2/2007 | Sull et al. ............... 715/523 |
| 2007/0033533 | A1* | 2/2007 | Sull ............... 715/752 |
| 2007/0038612 | A1* | 2/2007 | Sull et al. ............... 707/3 |
| 2007/0044010 | A1* | 2/2007 | Sull et al. ............ 715/500.1 |

OTHER PUBLICATIONS

Zhuang et al. Web-based image retrieval: a hygrid approach, Computer Graphics International 2001, pp. 62-69, Jul. 3-6, 2001.*

Jing et al. Keyword propagation for image retrieval, Circuit and System, 2004, vol. 2, p. II-53-56, May 23-26, 2004.*

Kim et al. QCluster: relevance feedback using adaptive clustering for content-based image retrieval, International conference on Management of Data, Proceeding of the 2003 ACM SIGMOD international conference on Management data, pp. 599-610, 2003.*

Shyu et al. A unified framework for image database clustering and content-based retrieval, ACM international Workshop on Multimedia Databases, Proceeding of the 2nd ACM international workshop on Multimeida databases, pp. 19-27, 2004.*

Ozetekin et al. Expert agreement and content based reranking in a meta search environment using Mearf, International World Wide Web Conference, Proceedings of the 11th international conference on World Wide Web, pp. 333-3344, 2002.*

Atsushi, et al; "A Flexible Content-Based Image Retrieval System with Combined Scene Description Keyword"; 1996 IEEE Proceedings of Multimedia '96; pp. 201-208.

Uehara, et al., MIRACLES : Multimedia Information RetrievAL, Classification, and Exploration System—Application to Web Document Retrieval, Technical Report of the Institute of Electronics, Information and Communication Engineers, Japan, May 2, 2000, vol. 100, No. 31, pp. 17-24.

Amano et al., "A Flexible Content-Based Image Retrieval System with Combined Scene Description Keyword," Jun. 17-23, 1996, IEEE Multimedia Computing and System, pp. 201-208.

Lai et al., "PBIR-MM: multimodal Image retrieval and annotation," 2002 ISBN: 1-58113-620-X, pp. 421-422.

Shevade et al., "Vidya: An experiential annotation system," 2003 ISBN: 1-508113, pp. 91-98.

* cited by examiner

SEMI-AUTOMATIC ANNOTATION OF MULTIMEDIA OBJECTS

RELATED APPLICATIONS

This is a continuation of and claims priority to U.S. patent application Ser. No. 09/702,288 filed Oct. 30, 2000 entitled "Semi-Automatic Annotation of Multimedia Objects" by inventors Wen-Yin Liu, and Hong-Jiang Zhang.

TECHNICAL FIELD

This invention relates to systems and methods for annotating multimedia objects, such as digital images, to facilitate keyword-based retrieval methods.

BACKGROUND

The popularity of digital images is rapidly increasing due to improving digital imaging technologies and convenient availability facilitated by the Internet. More and more digital images are becoming available every day. The images are kept in image databases, and retrieval systems provide an efficient mechanism for users to navigate through the growing numbers of images in the image databases.

Traditional image retrieval systems allow users to retrieve images in one of two ways: (1) keyword-based image retrieval or (2) content-based image retrieval. Keyword-based image retrieval finds images by matching keywords from a user query to keywords that have been added to the images. Content-based image retrieval (CBIR) finds images that have low-level image features similar to those of an example image, such as color histogram, texture, shape, and so forth. However, CBIR has a drawback in that searches may return entirely irrelevant images that just happen to possess similar features. Since content-based image retrieval has a low performance level, keyword-based image search is more preferable.

To facilitate keyword-based image retrieval, the images (or generally, multimedia objects) must first be labeled with one or more keywords. Labeling semantic content of images, or multimedia objects, with a set of keywords is a process known as image (or multimedia) annotation. Annotated images can be found using keyword-based search, while un-annotated image cannot.

Currently, most of the image database systems employ manual annotation, where users add descriptive keywords when the images are loaded, registered, or browsed. Manual annotation of image content is accurate because keywords are selected based on human perception of the semantic content of images. Unfortunately, manual annotation is obviously a labor intensive and tedious process. In fact, it may also introduce errors due to absent-minded and/or subjective users. Therefore, people are reluctant to use it.

To overcome the problems of manual annotation, automatic image annotation techniques have been proposed. One research team, for example, attempted to use image recognition techniques to automatically select appropriate descriptive keywords (within a predefined set) for each image. See, Ono, A et al., "A Fexible Content-Based Image Retrieval System with Combined Scene Description Keyword", *Proceedings of IEEE Int. Conf. on Multimedia Computing and Systems*, pp. 201-208, 1996. However, automatic image annotation has only been tested with very limited keywords and image models. It is not realistic to handle a wide range of image models and concepts. Moreover, since image recognition technique is admittedly at a low performance level, people cannot trust those keywords obtained automatically without their confirmation/verification.

Accordingly, there is a need for a new technique for annotating images, or other multimedia objects.

SUMMARY

A multimedia object retrieval and annotation system integrates an annotation process with object retrieval and relevance feedback processes. The annotation process annotates multimedia objects, such as digital images, with semantically relevant keywords. The annotation process is performed in background, hidden from the user, while the user conducts searches.

The annotation process is "semi-automatic" in that it utilizes both keyword-based information retrieval and content-based image retrieval techniques to automatically search for multimedia objects, and then encourages users to provide feedback on the retrieved objects. The user is asked to identify the returned objects as either relevant or irrelevant to the query keywords and based on this feedback, the system automatically annotates the objects with semantically relevant keywords and/or updates associations between the keywords and objects.

In the described implementation, the system performs both keyword-based and content-based retrieval. A user interface allows a user to specify a query in terms of keywords and/or examples objects. Depending on the input query, the system finds multimedia objects with keywords that match the keywords in the query and/or objects with similar content features. The system ranks the objects and returns them to the user.

The user interface allows the user to identify multimedia objects that are more relevant to the query, as well as objects that are less or not relevant. The system monitors the user feedback using a combination of feature-based relevance feedback and semantic-based relevance feedback.

If the multimedia object is deemed relevant by the user and is not yet annotated with the keyword, the system adds the keyword to the object. The objects and keywords are maintained in a database and a semantic network is constructed on top of the database to define associations between the keywords and objects. Weights are assigned to the keyword-object associations to indicate how relevant the keyword is to the object.

During the retrieval-feedback-annotation cycle, the system adjusts the weights according to the user feedback, thereby strengthening associations between keywords and objects identified as more relevant and weakening the associations between keywords and objects identified as less relevant. If the association becomes sufficiently weak, the system removes the keyword from the multimedia object.

Accordingly, the semi-automatic annotation process captures the efficiency of automatic annotation and the accuracy of manual annotation. As the retrieval-feedback-annotation cycle is repeated, both annotation coverage and annotation quality of the object database is improved.

DETAILED DESCRIPTION

This disclosure describes an annotation system for annotating multimedia objects, such as digital images, video clips, and audio objects, with semantically relevant keywords. The annotation system employs a "semi-automatic" annotation technique that captures the efficiency of automatic annotation and the accuracy of manual annotation. The semi-automatic annotation technique employs both keyword-based information retrieval and content-based image retrieval techniques to automate searches for objects, and then encourages uses to provide feedback to the result set of objects. The user identifies objects as either relevant or irrelevant to the query keywords and based on this feedback, the system automatically updates associations between the keywords and objects. As the retrieval-feedback-annotation cycle is repeated, the annotation coverage and annotation quality of the object database is improved.

The annotation process is accomplished in a hidden/implicit fashion, without the user's notice. As the user naturally uses the multimedia object database, more and more objects are annotated and the annotations become more and more accurate. The result is a set of keywords associated with each individual multimedia object in the database.

The annotation system is described in the context of an Internet-based image retrieval system that searches and retrieves images from an image database. It is noted, however, that the invention pertains to other multimedia objects besides digital images. Furthermore, the system may be implemented in other environments, such as a non-networked computer system. For instance, this technology may be applied to stand-alone image database systems.

Exemplary System

Figure 1:
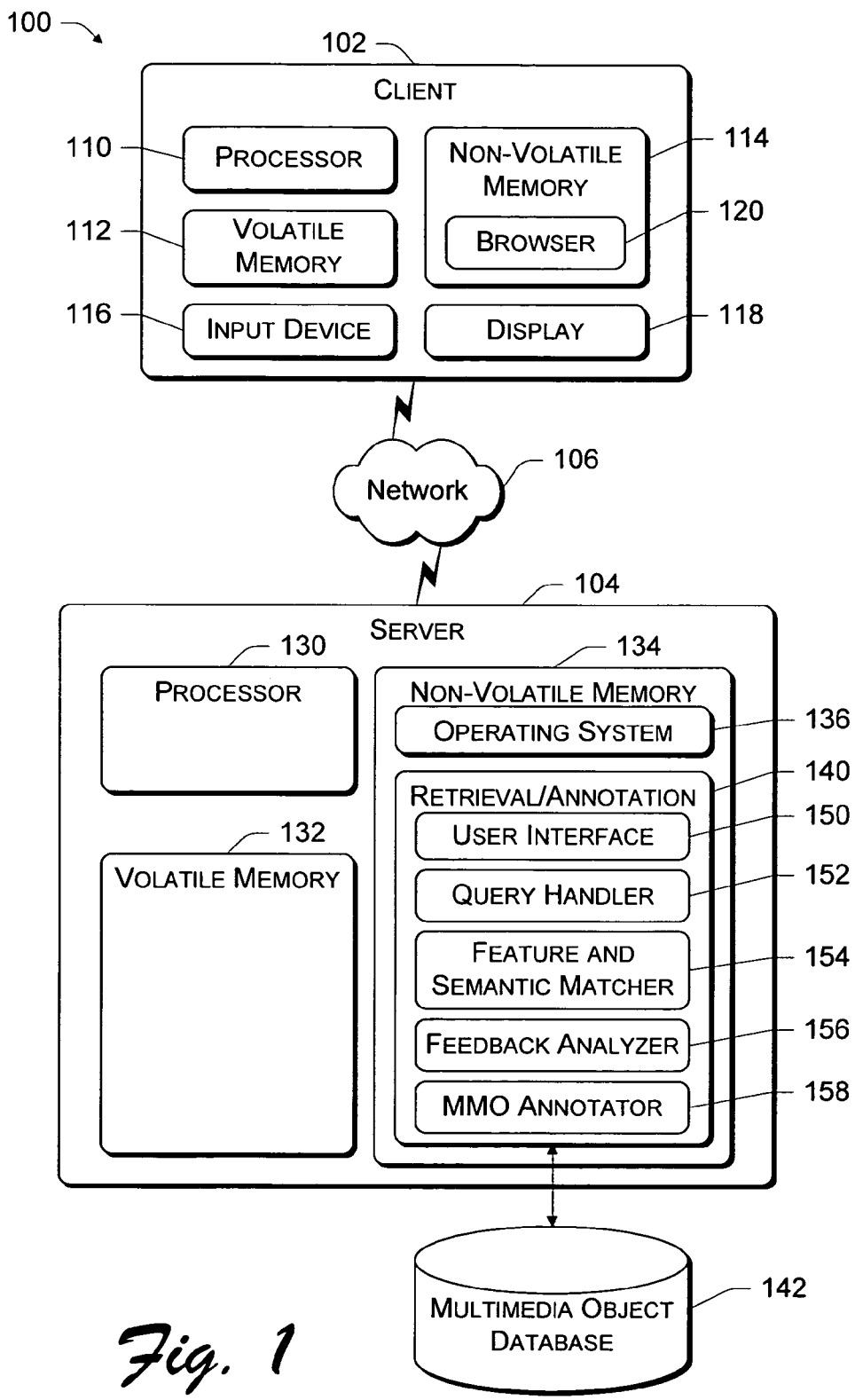
FIG. 1 is a block diagram of an exemplary computer network in which a server computer implements a multimedia object retrieval/annotation system that may be accessed over a network by one or more client computers.

FIG. 1 shows an exemplary computer network system 100 that implements an annotation system for annotating multimedia objects, such as digital images, with semantically relevant keywords. In the described implementation, the annotation system is integrated with a retrieval system that searches and retrieves objects from a database using both keyword-based retrieval techniques and content-based retrieval techniques.

The network system 100 includes a client computer 102 that submits queries to a server computer 104 via a network 106, such as the Internet. While the system 100 can be implemented using other networks (e.g., a wide area network or local area network) and should not be limited to the Internet, the system will be described in the context of the Internet as one suitable implementation. The web-based system allows multiple users to perform retrieval tasks simultaneously at any given time.

The client 102 is representative of many diverse computer systems, including general-purpose computers (e.g., desktop computer, laptop computer, etc.), network appliances (e.g., set-top box (STB), game console, etc.), and the like. The client 102 includes a processor 110, a volatile memory 112 (e.g., RAM), and a non-volatile memory 114 (e.g., ROM, Flash, hard disk, optical, etc.). The client 102 also has one or more input devices 116 (e.g., keyboard, keypad, mouse, remote control, stylus, microphone, etc.) and a display 118 to display the images returned from the retrieval system.

The client 102 is equipped with a browser 120, which is stored in non-volatile memory 114 and executed on processor 110, where memory 114 includes computer-readable medium such as ROM, Flash, hard disk, optical, RAID memory, etc. The browser 120 submits requests to and receives responses from the server 104 via the network 106. For discussion purposes, the browser 120 may be configured as a conventional Internet browser that is capable of receiving and rendering documents written in a markup language, such as HTML (hypertext markup language). The browser may further be used to present the images, or other multimedia objects, on the display 118.

The server 104 is representative of many different server environments, including a server for a local area network or wide area network, a backend for such a server, or a Web server. In this latter environment of a Web server, the server 104 may be implemented as one or more computers that are configured with server software to host a site on the Internet 106, such as a Web site for searching.

The server 104 has a processor 130, volatile memory 132 (e.g., RAM), and non-volatile memory 134 (e.g., ROM, Flash, hard disk, optical, RAID memory, etc.). The server 104 runs an operating system 136 and a multimedia retrieval/annotation system 140. For purposes of illustration, operating system 136 and retrieval/annotation system 140 are illustrated as discrete blocks stored in the non-volatile memory 134, although it is recognized that such programs and components reside at various times in different storage components of the server 104 and are executed by the processor 130. Generally, these software components are stored in non-volatile memory 134 and from there, are loaded at least partially into the volatile main memory 132 for execution on the processor 130.

The retrieval/annotation system 140 performs many tasks, including searching for multimedia objects in database 142 using keyword-based retrieval and content-based retrieval techniques, capturing user feedback as to the relevance of returned objects, and annotating the objects based on the user feedback. The retrieval/annotation system 140 includes a user interface 150, a query handler 152, a feature and semantic matcher 154, a feedback analyzer 156, and a multimedia object (MMO) annotator 158.

The user interface (UI) 150 supports three modes of user interaction: keyword-based search, search by example objects, and browsing the multimedia object database 142 using a pre-defined concept hierarchy. Thus, a user may choose to enter keywords or natural language queries, select an example image to use as the initial search query, or choose from a predefined hierarchy.

In the context of the Internet-based network system, the UI 150 can be served as an HTML document and rendered on the client display 118. In the standalone context, the UI 150 can be a locally running graphical user interface that presents the query interfaces and browsing functionality.

The query handler 152 handles queries received from the client 102 as a result of the user initiating searches via UI 150. The queries may be in the form of natural language queries, individual word queries, or content queries that contain low-level features of an example image that forms the basis of the search. Depending on the query type, the query handler 152 initiates a keyword or feature-based search of the database 142.

The feature and semantic matcher 154 attempts to find multimedia objects in database 142 that contain low-level features resembling the example object and/or have associated keywords that match keywords in the user query. The feature and semantic matcher 154 utilizes a semantic network to locate objects with similar keywords. The semantic network defines associations between the keywords and multimedia objects. Weights are assigned to the associations to indicate how relevant certain keywords are to the multimedia objects.

After locating a set of multimedia objects, the feature and semantic matcher 154 ranks the objects according to the weights of the semantic network and return the objects in rank order for review by the user. The returned objects are presented as thumbnails in a page that, when rendered on the client computer, allows the user to browse the objects. The user can mark or otherwise identify individual multimedia objects as more relevant to the query or as less or not relevant to the query.

The feedback analyzer 156 monitors the user feedback and analyzes which objects are deemed relevant to the search and which are not. The feedback analyzer 156 uses the relevance feedback to update the semantic network in the database.

The multimedia object annotator 158 uses the relevance feedback to annotate relevant objects with keywords from the query. The annotator may add new keywords to the objects, or adjust the weights of the semantic network by strengthening associations among keywords of the search query and relevant objects, and weakening associations among keywords and non-relevant objects.

Accordingly, the system facilitates a semi-automatic annotation process by combining automatic search efforts from content-based retrieval and semantic-based retrieval, together with the manual relevance feedback to distinguish relevant and irrelevant objects. In addition, the annotation process is hidden to the user as the user is simply performing natural operations of initiating and refining searches. Through the iterative feedback, annotations are added to the objects in a hidden fashion, thereby continually adapting and improving the semantic network utilized in the keyword-based retrieval. The annotation process yields tremendous advantages in terms of both efficiency and accuracy.

Retrieval and Annotation System Architecture

Figure 2:
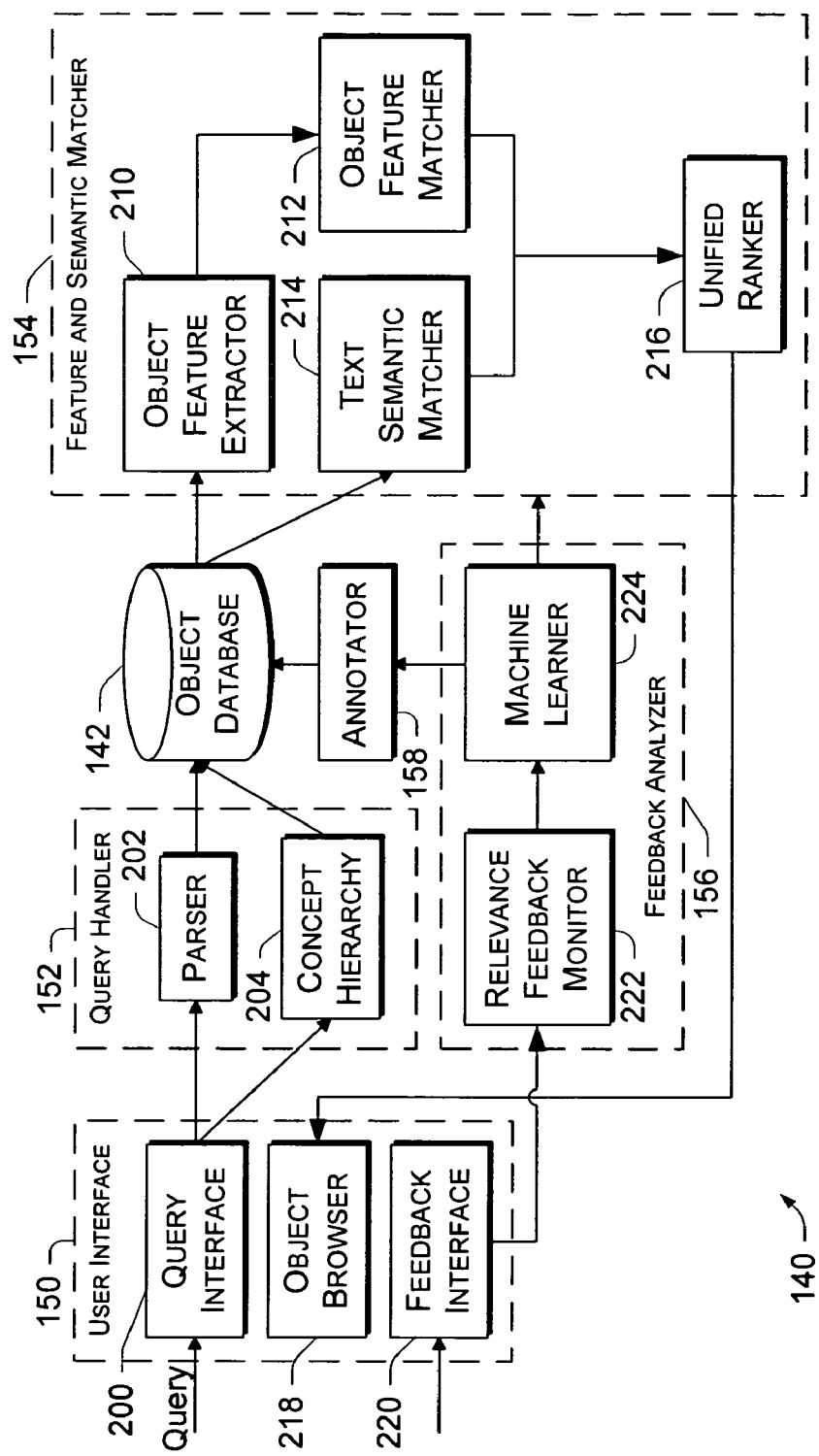
FIG. 2 is a block diagram of the retrieval/annotation system architecture.

FIG. 2 illustrates the retrieval/annotation system architecture 140 in more detail. The UI 150 has a query interface 200 that accepts text-based keyword or natural language queries as well as content-based queries resulting from selection of an example image (or other type of media object).

Figure 3:
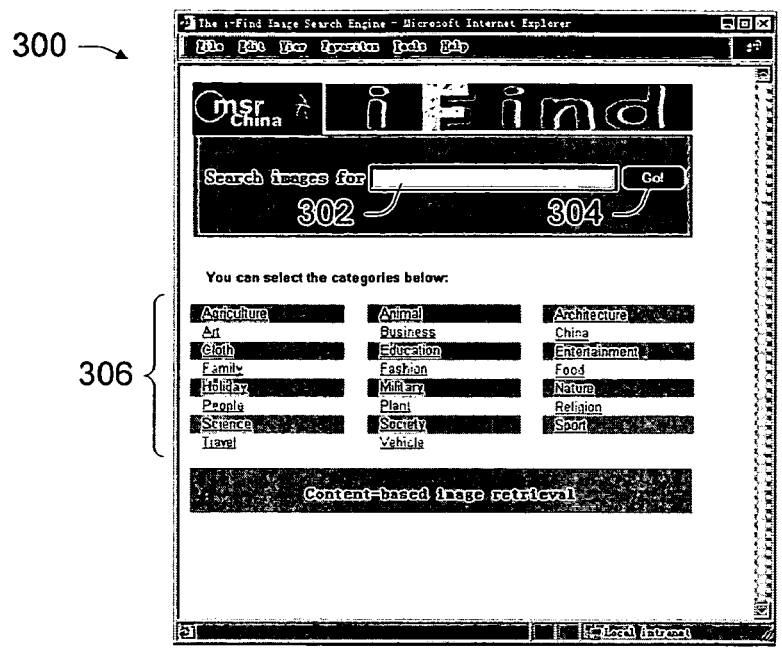
FIG. 3 illustrates a first screen view of a user interface for the retrieval/annotation system.

FIG. 3 shows an example of a query interface screen 300 presented by the user interface 150 for entry of a query. The screen 300 presents a natural language text entry area 302 that allows user to enter keywords, phrases, or complete sentences. After entering one or more words, the user actuates a button 304 that initiate the search for relevant objects. Alternatively, the user can browse a pre-defined concept hierarchy by selecting one of the categories listed in section 306 of the query screen 300. The user actuates the category link to initiate a search for objects within the category.

With reference again to FIG. 2, the query is passed to the query handler 152. In the illustrated implementation, the query handler 152 includes a natural language parser 202 to parse text-based queries, such as keywords, phrases, and sentences. The parser 202 is configured to extract keywords from the query, and may utilize syntactic and semantic information from natural language queries to better understand and identify keywords. The parsed results are used as input to the semantic network that associates keywords with images in the database 142.

Figure 4:
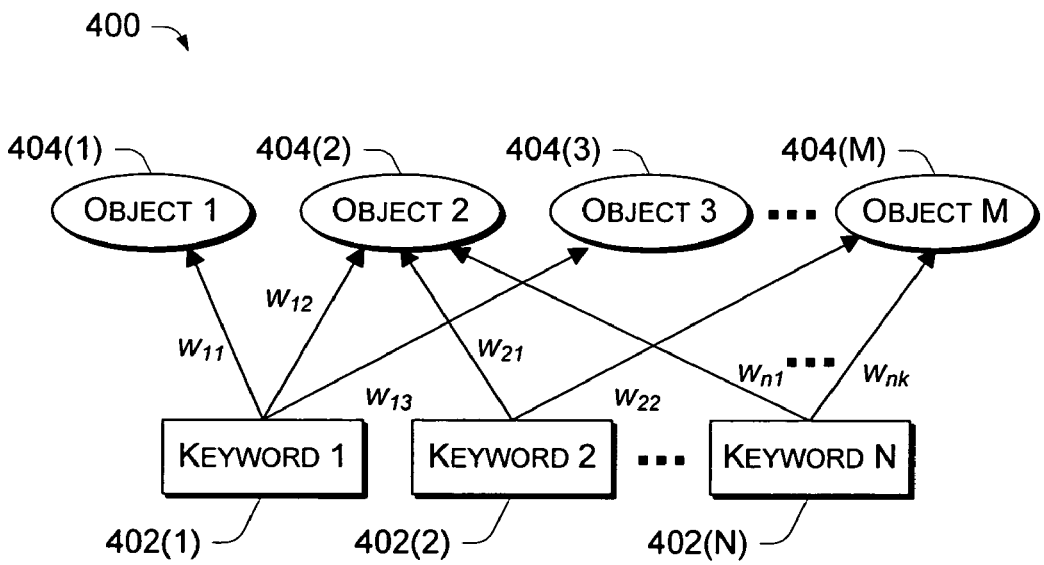
FIG. 4 illustrates a semantic network that represents relationships between keywords and multimedia objects.

FIG. 4 pictorially illustrates a semantic network 400. The network defines keyword-object links that associate keywords 402(1), 402(2), . . . 402(N) with images 404(1), 404(2), 404(3), . . . , 404(M) in the database 142. The keyword-object links are illustrated as arrows. A weight w is assigned to each individual link to represent the degree of relevance in which a keyword describes the linked multimedia object's semantic content. For example, the first keyword 402(1) is associated with three objects 404(1)-404(3) and the association with the first object 404(1) is assigned a weight $w_{11}$, the association with the second object 404(2) is assigned a weight $w_{12}$, and the association with the third object 404(3) is assigned a weight $w_{13}$.

Keyword-object associations may not be available at the beginning. Rather, the associations may be created and developed over time, as the user searches the object database. Keywords are initially associated with objects through a cycle of searching, returning results, and monitoring user feedback as to the relevance of the results to the query. The associations are then strengthened and weakened over time based on the user's feedback.

With reference again to FIG. 2, there may be a situation where the user does not wish to enter a text query. Instead, the user may be interested in selecting an example multimedia object, such as a digital image, and searching for images that have similar content features. To accommodate this scenario, the query interface 200 of the user interface 150 presents a set of image categories from which the user may choose, such as categories section 306 of screen 300 (FIG. 3). Upon selection of a category, the system returns a sample set of images pertaining to the category.

The retrieval/annotation system 140 accommodates this scenario with a predefined concept hierarchy 204 in query handler 152. The selected category is passed to the concept hierarchy 204, which identifies first level objects corresponding to the category from the image database 142. From the sample objects, the user can identify an object as the example object whose low-level features are used to initiate a content-based retrieval operation.

The feature and semantic matcher 154 identify multimedia objects in the database 142 that have keywords associated with the user query and/or contain low-level features resembling the example object. The feature and semantic matcher 154 includes a feature extractor 210 that extracts low-level features from the candidate objects in the database 142 that may be used in a content-based search. In the context of digital images, such low-level features include color histogram, texture, shape, and so forth. The feature extractor 210 passes the features to a feature matcher 212 to match the low-level features of the candidate objects with the low-level features of the example object submitted by the user. Candidate objects with more similar features are assigned a higher rank.

For text queries, the feature and semantic matcher 154 has a semantic matcher 214 to identify objects with associated keywords that match the keywords from the query. The semantic matcher 214 uses the semantic network 400 to locate those objects with links to the search keywords. Candidate objects with higher weighted links are assigned a higher rank.

A ranking module 216 ranks the multimedia objects such that the highest-ranking objects are returned to the user as the preferred results set. The ranking takes into account the weightings assigned to keyword-object links as well as the closeness in features between two objects. The set of highest-ranked objects are returned to the user interface 200 and presented to the user for consideration.

The user interface 150 has an object browser 218 that allows the user to browse the various objects returned from the keyword-based and content-based search. The returned objects are presented in scrollable pages, or as thumbnails in one or more pages.

Figure 5:
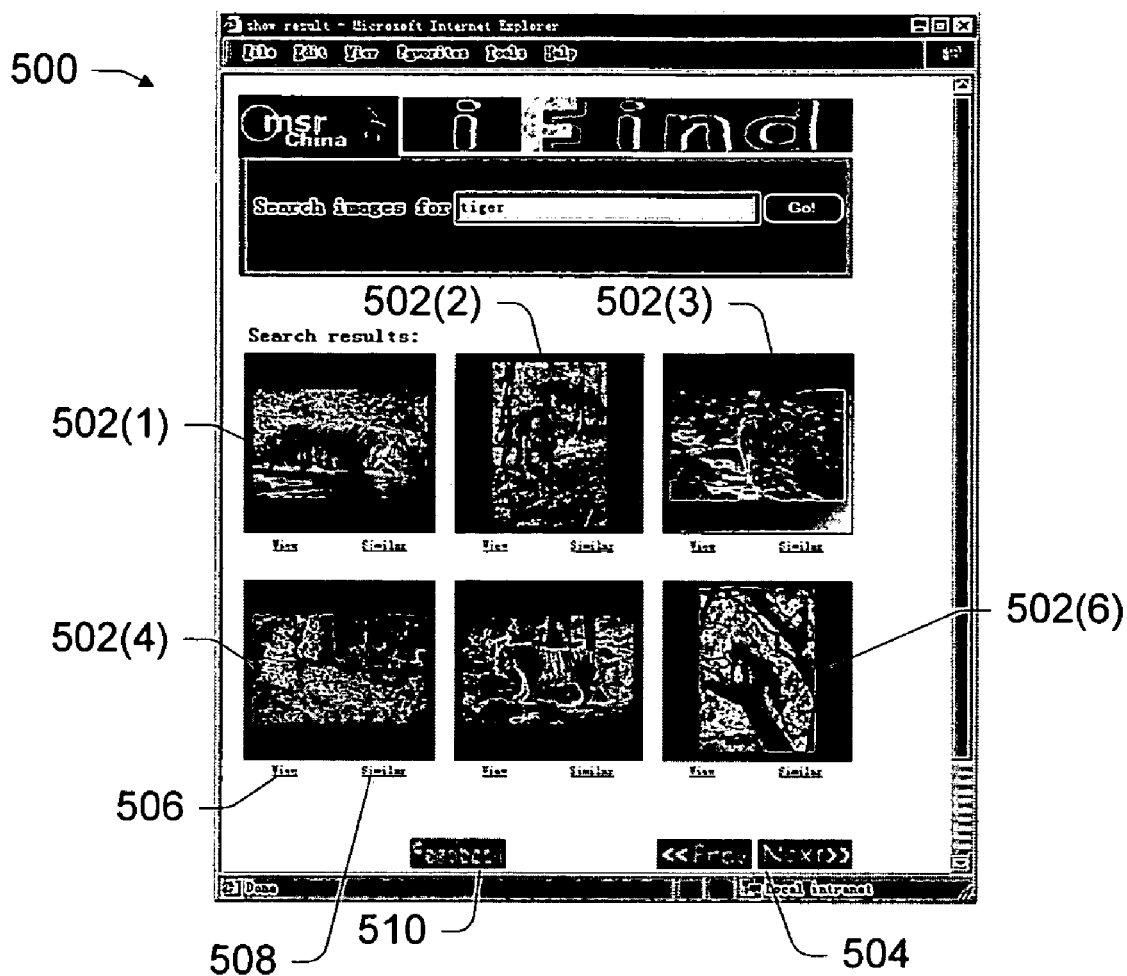
FIG. 5 illustrates a second screen view of the user interface for the retrieval/annotation system.

FIG. 5 shows an example results screen 500 containing a set of image objects returned in response to the user entering the keyword "tiger" into the text entry area 302 of query screen 300 (FIG. 3). Depending on display size, one or more images are displayed in the results screen 500. Here, six images 502(1)-502(6) are displayed at one time. If there are more images than can be displayed simultaneously, navigation "Next" and "Prev" buttons 504 are presented to permit browsing to other images in the result set.

The user interface allows the user to feedback relevance information as he/she browses the images. Each image has several feedback options. For instance, each image has a "View" link 506 that allows the user to enlarge the image for better viewing. Activation of a "Similar" link 508 initiates a subsequent query for images with both similar semantic content and similar low-level features as the corresponding image. This refined search will be presented in the next screen and this process may be repeated many times until the user finds a set of images that are highly relevant to the query.

Furthermore, each image has both positive and negative relevance marks that may be individually selected by the user. The relevance marks allow the user to indicate on an image-by-image basis, which images are more relevant to the search query and which are less relevant. Examples of such marks include a "+" and "−" combination, or a "thumbs up" and "thumbs down", or a change in background color (e.g., red means less relevant, blue means more relevant).

In the example screen 500, images 502(1), 502(2), and 502(5) are marked with a blue background, indicating a positive match that these images do in fact represent tigers. Images 502(4) and 502(6) have a red background, indicating that the do not match the query "tiger". Notice closely that these images contain leopards and not tigers. Finally, image 502(3) has a gradient background (neither positive nor negative) and will not be considered in the relevance feedback. This image presents a wolf, which has essentially no relevance to tigers.

After providing relevant feedback, the user activates the "Feedback" button 510 to submit the feedback to the feedback analyzer 156. The learning begins at this point to improve the image retrieval process for future queries.

Turning again to FIG. 2, the feedback analyzer 156 monitors this user feedback. A relevance feedback monitor 220 tracks the feedback and performs both semantic-based relevance feedback and low-level feature relevance feedback in an integrated fashion. The feedback analyzer 156 further implements a machine learning algorithm 222 to train the semantic-based retrieval model and the feature-based retrieval model based on the relevance feedback to thereby improve the results for future search efforts on the same or similar keywords. One particular implementation of an integrated framework for semantic-based relevance feedback and feature-based relevance feedback is described below in more detail under the heading "Integrated Relevance Feedback Framework".

The annotator 158 uses the relevance feedback to annotate the objects in the database 142. In this manner, annotation takes place in a hidden way whenever relevance feedback is performed. The annotator 158 assigns initial keywords to the objects in response to user queries, thereby creating the links in the semantic network 400. The annotator 158 continually adjust the weights assigned to keyword-object links over time as the user continues the search and refinement process.

The retrieval/annotation system 140 offers many advantages over conventional systems. First, it locates images using both keywords and low-level features, thereby integrating keyword-based image retrieval and content-based image retrieval. Additionally, it integrates both semantic-based relevance feedback and feature-based relevance feedback. A further benefit is the semi-automatic annotation process that takes place in the background. As the query-retrieval-feedback process iterates, the system annotates objects and modifies the semantics network.

Retrieval and Annotation Process

Figure 6:
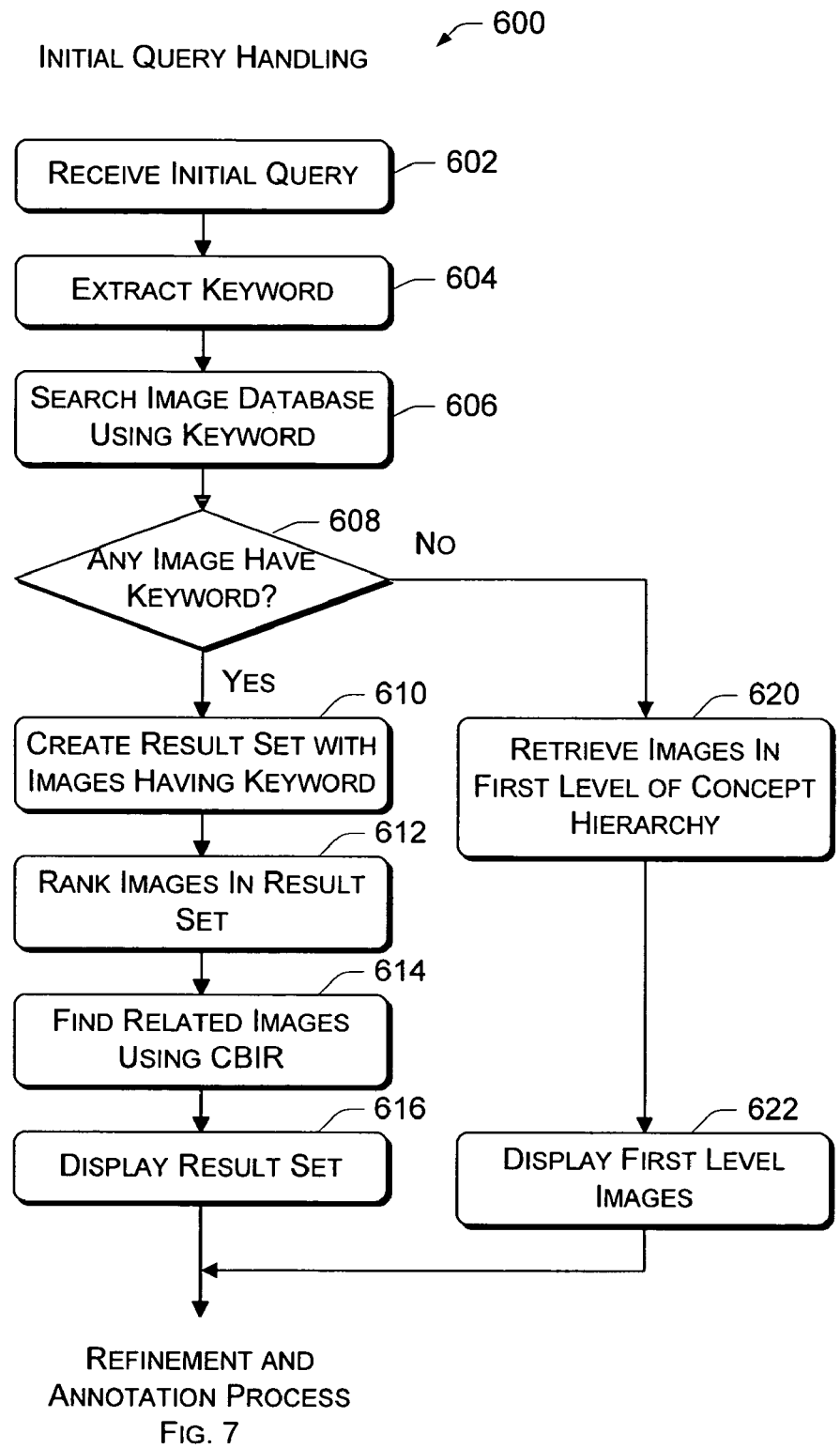
FIG. 6 is a flow diagram of an initial query handling process in which a user initially submits a keyword query for a multimedia object.
Figure 7:
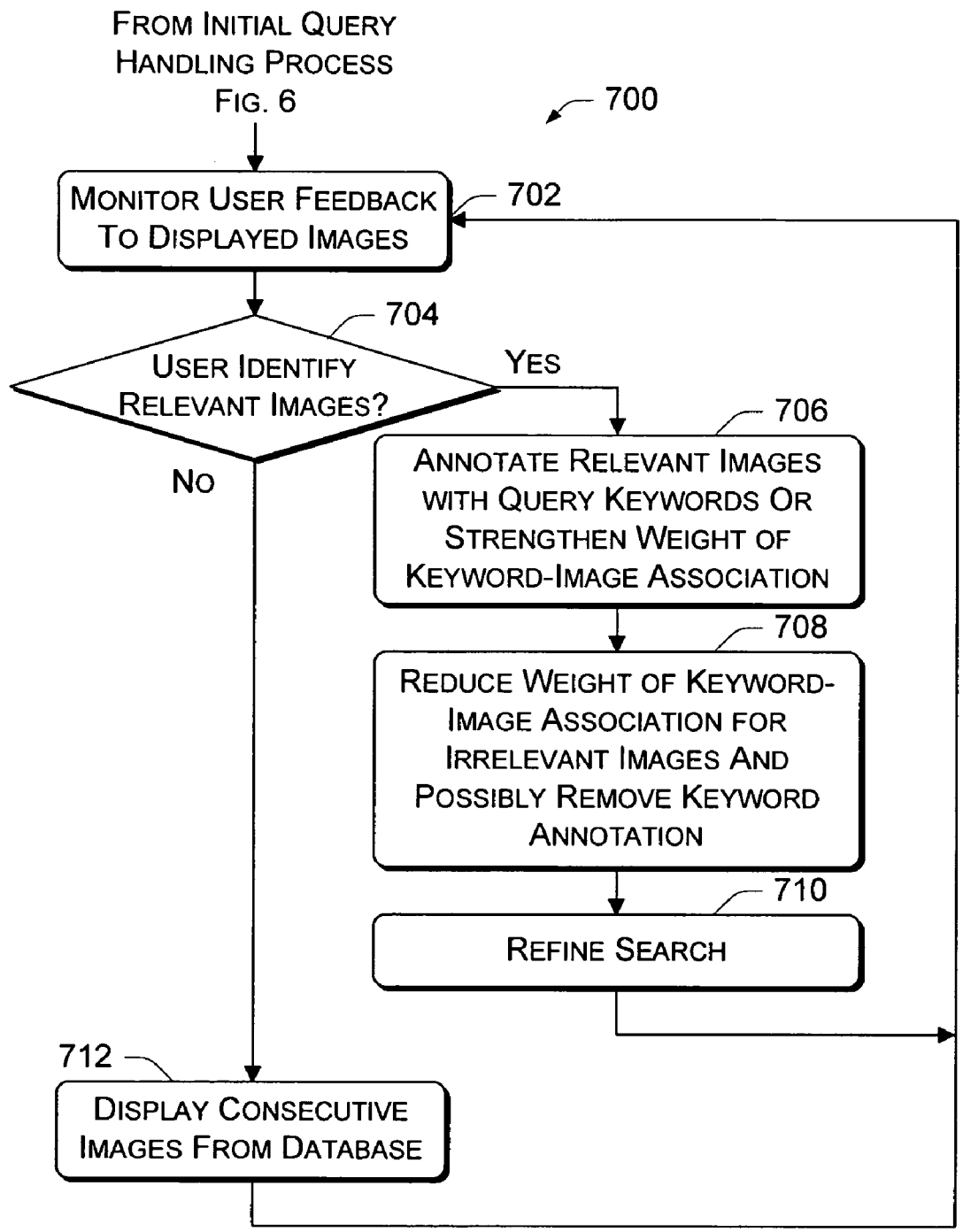
FIG. 7 is a flow diagram of a refinement and annotation process in which the retrieval/annotation system learns from the user's feedback pertaining to how relevant the objects are to the initial query and annotates the objects accordingly.

FIGS. 6 and 7 show a retrieval and annotation process implemented by the system 140 of FIG. 2. The process entails a first phase for producing an original object result set from an initial query (FIG. 6) and a second phase for refining the search efforts, training the search models and annotating the objects based on user feedback to the result set (FIG. 7). In one implementation, the image retrieval process is implemented as computer executable instructions that, when executed, perform the operations illustrated as blocks in FIGS. 6 and 7.

For discussion purposes, the process is described in the context of an image retrieval system for retrieving images from the image database. However, the process may be implemented using other types of multimedia objects. The process further assumes that a coarse concept hierarchy of the available images exists. For instance, images of people may be coarsely annotated generally as "people" and more particularly as "men" and "women". In addition, the low-level features of the images in the image database 142 may be calculated offline and correlated with the images through a data structure. This removes any potential slowdown caused by computing low-level features during the image retrieval process.

At block 602, the retrieval/annotation system 140 receives an initial query submitted by a user via the user interface 150. Suppose the user enters a search query to locate images of "tigers" by, for example, entering any of the following queries into the query screen 300 (FIG. 3):

"tigers"

"tiger pictures"

"Find pictures of tigers"

"I'm looking for images of tigers."

At block 604, the query handler 152 parses the user query to extract one or more keywords. In our example, the keyword "tiger" can be extracted from anyone of the queries. Other words, such as "pictures" and "images" may also be extracted, but we'll focus on the keyword "tiger" for illustration purposes.

At block 606, the retrieval/annotation system 140 automatically searches the image database 142 to identify images annotated with the keyword "tiger". The system may also simultaneously search of similar words (e.g., cat, animal, etc.). Block 606 distinguishes between two possible situations. In the first case, there are some images already annotated with the keyword(s) that match the query, meaning the images have either been manually annotated by the user when the images were registered into the system, or the system has been used according to this invention for some time and annotations have already been added. In the second case, there is no image in the database that has been annotated with the query keyword(s), either because the database has never before been searched or because the keyword is a new search term that is not recognized by the system.

If any images in the database have a link association with the keyword (i.e., the first case, as represented by the "yes" branch from block 608), those images are placed into a result set (block 610). The images in the result set are then ranked according to the weights assigned to the keyword-image links in the semantic network (block 612). Having identified a set of images that match the keyword, the features and semantic matcher 154 may also attempt to find other images with similar low-level features as those in the result set (block 614). Any such images are then added to the result set. The expanded result set is then displayed to the user via the user interface 150, such as via results screen 500 in FIG. 5 (block 616).

It is noted that while such additional images may resemble other images in the original result set, certain images discovered via low-level feature comparison may have nothing to do with the search keyword. That is, operation 614 may return images that resemble the color or texture of another image with a tiger, but have no trace of a tiger anywhere in the image.

Returning to block 608, if the initial keyword search fails to locate any images (i.e., the second case, as represented by the "no" branch from block 608), the image retrieval system 140 retrieves images in a first level of the concept hierarchy (block 620). These images may be randomly selected from one or more categories in the hierarchy since no keyword is matched and no image semantically relevant to the query keyword can be found. The images are displayed to the user to suggest possible example images (block 622).

After the initial query, the retrieval/annotation system 140 can use the results and user feedback to refine the search, train the retrieval model, and annotate the images in the image database. The refinement and annotation process is illustrated in FIG. 7.

At block 702, the feedback analyzer 156 monitors the user feedback to the images in the result set. At this point, two possible scenarios arise. One scenario is that the retrieval process returns one or more relevant images, perhaps along with one or more irrelevant images. A second scenario is where the result set contains no relevant images and user is simply going to select an example image.

Suppose the user sees certain images that he/she deems relevant to the query and decides to select those images for a refined search (i.e., the first scenario, as represented by the "yes" branch from block 704). The user may mark or otherwise indicate one or more images as relevant to the search query, as well as mark those images that are irrelevant. This can be done, for example, through a user interface mechanism in which the user evaluates each image and activates (e.g., by a point-and-click operation) a positive mark or a negative mark associated with the image. The positive mark indicates that the image is more relevant to the search, whereas the negative mark indicates that the image is less or not relevant to the search. After marking the images, the user initiates a refinement search, for example, by clicking the "Feedback" button 510 in screen 500 (FIG. 5).

Based on this feedback, the annotator 158 may follow one of two courses (block 706). If any image has not been annotated beforehand with the query keyword, the annotator 158 annotates that image in the image database with the keywords from the query and assigns an initial weight to the association link in the semantic network. As an example, the initial link might be assigned a weight value of "1". If the image has already been annotated, the weight of this keyword for this image is increased with some given increment, such as "1", so that over time, the weight of strongly associated keywords and images grows large. A large weight represents a higher confidence that the search is accurate when keywords are used to identify images.

The annotator 158 also adjusts the annotations for irrelevant images and/or modifies the weighting of the semantic network (block 708). For each irrelevant image, the weight of the keyword-image link is decreased by some value. In one implementation, the weight is reduced by one-fourth of its original value. If the weight becomes very small (e.g., less than 1), the annotator 158 removes the keyword from the annotation of this image. It is noted that there may be many methods that can be used to re-weight the keywords during the annotation process, and the above re-weighting scheme is only an exemplary implementation.

At block 710, the retrieval/annotation process performs another retrieval cycle based on the user feedback to refine the search. The results are once again presented to the user for analysis as to their relevancy.

Block 712 accounts for the situation where the original query did not return any relevant images, nor did the user find an example image to refine the search. In this situation, the retrieval/annotation system simply outputs images in the database one page at a time to let the user browse through and select the relevant images to feed back into the system.

Integrated Relevance Feedback Framework

This section described on exemplary implementation of integrating semantic-based relevance feedback with low-level feature-based relevance feedback. Semantic-based relevance feedback can be performed relatively easily compared to its low-level feature counterpart. One exemplary implementation of semantic-based relevance feedback is described first, followed by how this feedback can be integrated with feature-based relevance feedback.

For semantic-based relevance feedback, a voting scheme is used to update the weights $w_{ij}$ associated with each link in the semantic network 300 (FIG. 3). The weight updating process is described below.

Step 1: Initialize all weights $w_{ij}$ to 1. That is, every keyword is initially given the same importance.

Step 2: Collect the user query and the positive and negative feedback examples.

Step 3: For each keyword in the input query, check if any of them is not in the keyword database. If so, add the keyword(s) into the database without creating any links.

Step 4: For each positive example, check if any query keyword is not linked to it. If so, create a link with weight "1" from each missing keyword to this image. For all other keywords that are already linked to this image, increase the weight by "1".

Step 5: For each negative example, check to see if any query keyword is linked with it. If so, set the new weight $w_{ij}=w_{ij}/4$. If the weight $w_{ij}$ on any link is less than 1, delete that link.

It can be easily seen that as more queries are input, the system is able to expand its vocabulary. Also, through this voting process, the keywords that represent the actual semantic content of each image are assigned larger weights.

As noted previously, the weight $w_{ij}$ associated on each keyword-image link represents the degree of relevance in which this keyword describes the linked image's semantic content. For retrieval purposes, another consideration is to avoid having certain keywords associated with a large number of images in the database. The keywords with many links to many images should be penalized. Therefore, a relevance factor $r_{ij}$ of the $i^{th}$ keyword association to the $j^{th}$ image be computed as follows:

$$r_{ij} = w_{ij}\left(\log_2 \frac{M}{d_i} + 1\right)$$

where M is the total number of images in the database, and $d_i$ is the number of links that the $i^{th}$ keyword has.

Now, the above semantic-based relevance feedback needs to be integrated with the feature-based relevance feedback. It is known from previous research (See, Rui, Y., Huang, T. S. "A Novel Relevance Feedback Technique in Image Retrieval," ACM Multimedia, 1999) that the ideal query vector $q_i^*$ for feature i is the weighted average of the training samples for feature i given by:

$$q_i^{T*} = \frac{\pi^T X_i}{\sum_{n=1}^{N} \pi_n} \quad (3)$$

where $X_i$ is the $N \times K_i$ training sample matrix for feature i, obtained by stacking the N training vectors $x_{ni}$ into a matrix, and where N is an element vector $\pi = [\pi_1, \ldots \pi_N]$ that represents the degree of relevance for each of the N input training samples. The optimal weight matrix $W_i^*$ is given by:

$$W_i^* = (\det(C_i))^{\frac{1}{K_i}} C_i^{-1} \quad (4)$$

where $C_i$ is the weighted covariance matrix of $X_i$. That is:

$$C_{i_n} = \frac{\sum_{n=1}^{N} \pi_n (x_{nir} - q_{ir})(x_{nis} - q_{is})}{\sum_{n=1}^{N} \pi_n} \, r, s = 1, \ldots, K_i \quad (5)$$

The critical inputs into the system are $x_{ni}$ and $\pi$. Initially, the user inputs these data to the system. However, this first step can be eliminated by automatically providing the system with this initial data. This is done by searching the semantic network for keywords that appear in the input query. From these keywords, the system follows the links to obtain the set of training images (duplicate images are removed). The vectors $x_{ni}$ can be computed easily from the training set. The degree of relevance vector $\pi$ is computed as follows:

$$\pi_i = \alpha^M \sum_{j=1}^{M} r_{ij} \quad (6)$$

where M is the number of query keywords linked to the training image i, $r_{ij}$ is the relevance factor of the $i^{th}$ keyword associated with image j, and $\alpha > 1$ is a suitable constant. The degree of relevance of the $j^{th}$ image increases exponentially with the number of query keywords linked to it. In the one implementation, an experimentally determined setting of $\alpha = 2.5$ yielded the best results.

To incorporate the low-level feature based feedback and ranking results into high-level semantic feedback and ranking, a unified distance metric function $G_j$ is defined to measure the relevance of any image j within the image database in terms of both semantic and low-level feature content. The function $G_j$ is defined using a modified form of the Rocchio's formula as follows:

$$G_j = \log(1 + \pi_j) D_j + \beta \quad (7)$$

$$\left\{ \frac{1}{N_R} \sum_{k \in N_P} \left[ \left(1 + \frac{I_1}{A_1}\right) S_{jk} \right] \right\} -$$

$$\gamma \left\{ \frac{1}{N_N} \sum_{k \in N_N} \left[ \left(1 + \frac{I_2}{A_2}\right) S_{jk} \right] \right\}$$

where $D_j$ is the distance score computed by the low-level feedback, $N_R$ and $N_N$ are the number of positive and negative feedbacks respectively, $I_1$ is the number of distinct keywords in common between the image j and all the positive feedback images, $I_2$ is the number of distinct keywords in common between the image j and all the negative feedback images, $A_1$ and $A_2$ are the total number of distinct keywords associated with all the positive and negative feedback images respectively, and finally $S_{ij}$ is the Euclidean distance of the low-level features between the images i and j.

The first parameter $\alpha$ in Rocchio's formula is replaced with the logarithm of the degree of relevance of the $j^{th}$ image. The other two parameters $\beta$ and $\gamma$ can be assigned a value of 1.0 for simplicity. However, other values can be given to emphasize the weighting difference between the last two terms.

Using the method described above, the combined relevance feedback is provided as follows.

Step 1: Collect the user query keywords

Step 2: Use the above method to compute $x_{ni}$ and $\pi$ and input them into the low-level feature relevance feedback component to obtain the initial query results.

Step 3: Collect positive and negative feedbacks from the user.

Step 4: Update the weighting in the semantic network according to the 5-step process described earlier in this section.

Step 5: Update the weights of the low-level feature based component.

Step 6: Compute the new $x_{ni}$ and $\pi$ and input into the low-level feedback component. The values of $x_{ni}$ may be computed beforehand in a pre-processing step.

Step 7: Compute the ranking score for each image using equation 7 and sort the results.

Step 8: Show new results and go to step 3.

The image retrieval system is advantageous over prior art systems in that it learns from the user's feedback both semantically and in a feature based manner. In addition, if no semantic information is available, the process degenerates into conventional feature-based relevance feedback, such as that described by Rui and Huang in the above-cited "A Novel Relevance Feedback Technique in Image Retrieval".

New Object Registration

Adding new multimedia objects into the database is a very common operation under many circumstances. For retrieval systems that entirely rely on low-level content features, adding new objects simply involves extracting various feature vectors for the set of new objects. However, since the retrieval system utilizes keywords to represent the objects' semantic contents, the semantic contents of the new objects have to be labeled either manually or automatically. In this section, an automatic labeling technique is described.

The automatic labeling technique involves guessing the semantic content of new objects using low-level features. The following is an exemplary process for digital images:

Step 1: For each category in the database, compute the representative feature vectors by determining the centroid of all images within this category.

Step 2: For each category in the database, find the set of representative keywords by examining the keyword association of each image in this category. The top N keywords with largest weights whose combined weight does not exceed a previously determined threshold $\tau$ are selected and added into the list of the representative keywords. The value of the threshold $\tau$ is set to 40% of the total weight.

Step 3: For each new image, compare its low-level feature vectors against the representative feature vectors of each category. The images are labeled with the set of representative keywords from the closest matching category with an initial weight of 1.0 on each keyword.

Because the low-level features are not enough to present the images' semantics, some or even all of the automatically labeled keywords will inevitably be inaccurate. However, through user queries and feedbacks, semantically accurate keywords labels will emerge while semantically inaccurate keywords will slowly be eliminated.

Another problem related to automatic labeling of new images is the automatic classification of these images into predefined categories. This problem is addressed by the following process:

Step 1: Put the automatically labeled new images into a special "unknown" category.

Step 2: At regular intervals, check every image in this category to see if any keyword association has received a weight greater than a threshold $\xi$. If so, extract the top N keywords whose combined weight does not exceed the threshold $\tau$.

Step 3: For each image with extracted keywords, compare the extracted keywords with the list of representative keywords from each category. Assign each image to the closest matching category. If none of the available categories result in a meaningful match, leave this image in the "unknown" category.

The keyword list comparison function used in step 3 of the above algorithm can take several forms. An ideal function would take into account the semantic relationship of keywords in one list with those of the other list. However, for the sake of simplicity, a quick function only checks for the existence of keywords from the extracted keyword list in the list of representative keywords.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

We claim:

1. A computer-readable medium having computer-executable instructions for performing steps comprising:

identifying, in response to a search query, first multimedia objects having an associated keyword that matches a keyword in the search query, and identifying second multimedia objects that have content features similar to those of the first multimedia objects, wherein the content features do not match the keyword in the search query; presenting the first and second multimedia objects to a user;

monitoring feedback from the user as to which of the first and second multimedia objects are relevant to the search query;

maintaining associations between the associated and search query keywords and the first and second multimedia objects, the associations being weighted to indicate how relevant the keywords are to the multimedia objects;

adjusting the weights of the associations based on the users feedback, wherein the adjusting comprises increasing an initial weight of an association between the keyword and a particular multimedia object that is deemed relevant by the user or/and decreasing the initial weight of an association between the keyword and a particular multimedia object that is deemed irrelevant by the user; and annotating one or more of the second multimedia objects, which are deemed relevant by the user, with the keyword, wherein results are made available for image retrieval.

2. The computer readable medium of claim 1 having further computer-readable instructions for performing the step of removing the keyword from the particular multimedia object in an event that the weight is less than a threshold value.

3. The computer readable medium of claim 1 having further computer-readable instructions for performing the step of training how the first and second multimedia objects are identified based on the user's feedback.

4. The computer readable medium of claim 1 having further computer-readable instructions for performing the step of refining the search to identify additional multimedia objects that contain content features similar to those of the multimedia objects indicated by the user as being relevant.

5. The computer readable medium of claim 1 wherein the multimedia objects comprise one of digital images, video objects, and audio objects.

6. The computer readable medium of claim 1 wherein the step of presenting comprises using content-based information retrieval to retrieve the multimedia objects.

7. The computer readable medium of claim 1 wherein the step of presenting comprises using both content-based information retrieval and semantic-based information retrieval to retrieve the multimedia objects.

8. The computer readable medium of claim 1 wherein the step of monitoring comprises monitoring both feature-based relevance feedback and semantic-based relevance feedback.

9. The computer readable medium of claim 1 wherein the step of annotating is hidden from the user.

10. The computer readable medium of claim 1 wherein the step of annotating comprises:

in an event that a particular multimedia object is deemed irrelevant by the user and is already annotated with the keyword, weakening an association between the keyword and the particular multimedia object.

11. A computer-readable medium having computer-executable instructions for performing steps comprising:
identifying, in response to a search query, first multimedia objects having an associated keyword that matches a keyword in the search query, and identifying second multimedia objects that have content features similar to those of the first multimedia objects,
wherein the content features do not match the keyword in the search query; presenting the first and second multimedia objects to a user;
monitoring feedback from the user as to which of the multimedia objects are relevant;
annotating one or more of the multimedia objects based on the user's feedback, with a keyword;
in an event that a particular multimedia object is deemed relevant by the user and not yet annotated with the keyword, adding the keyword to the particular multimedia object; and
in an event that the particular multimedia object is deemed relevant by the user and is already annotated with the keyword, strengthening an association between the keyword and the particular multimedia object, wherein results ate made available for image retrieval.

12. The computer readable medium of claim 11 wherein the step of monitoring comprises monitoring both feature-based relevance feedback and semantic-based relevance feedback.

13. The computer readable medium of claim 11 wherein the step of annotating is hidden from the user.

14. The computer readable medium of claim 11 wherein the step of annotating comprises:
in an event that a particular multimedia object is deemed irrelevant by the user and is already annotated with the keyword, weakening an association between the keyword and the particular multimedia object.

15. The computer readable medium of claim 11 wherein the step of annotating comprises:
in an event that a particular multimedia object is deemed irrelevant by the user and is already annotated with the keyword, removing the keyword from the particular multimedia object.

16. An image retrieval system comprising:
a means for retrieving multimedia objects from a database based on a search query first multimedia objects having an associated keyword that matches a keyword in the search query, and identifying second multimedia objects that have content features similar to those of the first multimedia objects wherein the content features do not match the keyword in the search query;
a means for capturing a user's feedback as to whether the multimedia objects are relevant to the search query; and
a means for annotating, with the keyword, the second multimedia objects based on the user's feedback,
wherein the search query comprises a keyword-based search query having at least one keyword and in an event that a particular multimedia object is deemed relevant by the user and is already annotated with the keyword, the annotation unit strengthens an association between the keyword and the particular multimedia object, and/or in an event that a particular multimedia object is deemed irrelevant by the user and is already annotated with the keyword, removing the keyword from the particular multimedia object, and/or in an event that a particular multimedia object is deemed irrelevant by the user and is already annotated with the keyword, weakening an association between the keyword and the particular multimedia object, wherein results are made available for image retrieval.

17. The image retrieval system as recited in claim 16, wherein the search query comprises a keyword-based search query having one or more keywords.

18. The image retrieval system as recited in claim 16, wherein the search query comprises a content-based search query having one or more content features.

19. The image retrieval system as recited in claim 16, wherein the means for retrieving information employs both content-based information retrieval and semantic-based information retrieval.

20. The image retrieval system as recited in claim 16, wherein the means for retrieving information comprises:
a means for handling both keyword-based queries having one or more search keywords and content-based queries having one or more content features of a multimedia object; and
a means for identifying at least one of (1) first multimedia objects having keywords that match the search keywords from a keyword-based query, and (2) second multimedia objects having content features similar to the content features of a content-based query.

21. The image retrieval system as recited in claim 16, wherein the means for capturing employs both feature-based relevance feedback and semantic-based relevance feedback.

22. The image retrieval system as recited in claim 16, wherein:
the search query comprises a keyword-based search query having at least one keyword; and
in an event that a particular multimedia object is deemed relevant by the is user and is not yet annotated with the keyword, the annotation unit adds the keyword to the particular multimedia object.

23. The image retrieval system as recited in claim 16, wherein the means for capturing comprises a feedback analyzer to train the system based on the user's feedback.

* * * * *